US012093644B2

United States Patent
Thota et al.

(10) Patent No.: US 12,093,644 B2
(45) Date of Patent: Sep. 17, 2024

(54) SYSTEM FOR ANALYZING AND PRESCRIBING CONTENT CHANGES TO ACHIEVE TARGET READABILITY LEVEL

(71) Applicant: Microsoft Technology Licensing, LLC, Redmond, WA (US)

(72) Inventors: Jayasudha Thota, Bellevue, WA (US); Gabriele Masili, Mercer Island, WA (US); Rodney Derek Brown, Fort Mill, SC (US); Kartik Krishnan, Charlotte, NC (US); Raymond Robert Ringhiser, Maple Valley, WA (US); Anusha Meka, Davidson, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/121,236

(22) Filed: Dec. 14, 2020

(65) Prior Publication Data
US 2022/0188514 A1    Jun. 16, 2022

(51) Int. Cl.
| | |
|---|---|
| G06F 40/253 | (2020.01) |
| G06F 40/166 | (2020.01) |
| G09B 5/02 | (2006.01) |
| G09B 19/00 | (2006.01) |
| G06F 3/0482 | (2013.01) |

(52) U.S. Cl.
CPC .......... *G06F 40/253* (2020.01); *G06F 40/166* (2020.01); *G09B 5/02* (2013.01); *G09B 19/00* (2013.01); *G06F 3/0482* (2013.01)

(58) Field of Classification Search
CPC ....... G06F 40/253; G06F 40/166; G09B 5/02; G09B 19/00

USPC ........................................................ 715/271
See application file for complete search history.

(56) References Cited

U.S. PATENT DOCUMENTS

| | | | |
|---|---|---|---|
| 5,576,955 A | 11/1996 | Newbold et al. | |
| 5,940,847 A | 8/1999 | Fein et al. | |
| 6,047,300 A * | 4/2000 | Walfish | G06F 40/232 |
| | | | 715/257 |
| 6,583,798 B1 | 6/2003 | Hoek et al. | |

(Continued)

FOREIGN PATENT DOCUMENTS

| | | |
|---|---|---|
| DE | 102010027146 A1 | 1/2012 |
| WO | 2006035402 A1 | 4/2006 |
| WO | 2012076742 A1 | 6/2012 |

OTHER PUBLICATIONS

Webster's New World College Dictionary definition of elegant.*
(Continued)

*Primary Examiner* — Sherrod L Keaton
(74) *Attorney, Agent, or Firm* — NovoTechIP International PLLC

(57) ABSTRACT

A system for analyzing and prescribing content changes to achieve target readability level evaluates a readability score for a file at least at a whole document level and a sentence level based on a designated readability index; identifies one or more sentences that contribute to the file having the whole document level readability score outside a desired readability score of the readability index; provides a visual indicator for each of the identified one or more sentences; and re-evaluating the readability score for the file at the whole document level upon at least one of the identified one or more sentences being changed.

19 Claims, 14 Drawing Sheets

(56) References Cited

U.S. PATENT DOCUMENTS

| | | | | |
|---|---|---|---|---|
| 7,136,877 | B2* | 11/2006 | Volcani | G06F 40/247 704/10 |
| 9,218,333 | B2 | 12/2015 | Liensberger | |
| 9,292,621 | B1 | 3/2016 | Roth | |
| 11,544,467 | B2 | 1/2023 | Turcato et al. | |
| 2011/0313757 | A1* | 12/2011 | Hoover | G06F 40/205 704/9 |
| 2013/0151956 | A1 | 6/2013 | Allen | |
| 2014/0104175 | A1 | 4/2014 | Ouyang et al. | |
| 2014/0324883 | A1* | 10/2014 | Deolalikar | G06F 16/345 707/748 |
| 2014/0358519 | A1* | 12/2014 | Mirkin | G06F 40/51 704/3 |
| 2015/0199913 | A1 | 7/2015 | Mayfield et al. | |
| 2015/0347383 | A1 | 12/2015 | Willmore et al. | |
| 2016/0253299 | A1 | 9/2016 | Mese et al. | |
| 2017/0178528 | A1 | 6/2017 | Mayfield et al. | |
| 2017/0220360 | A1 | 8/2017 | Chiba et al. | |
| 2017/0220536 | A1 | 8/2017 | Chiba et al. | |
| 2019/0050387 | A1 | 2/2019 | Sanghavi et al. | |
| 2020/0334329 | A1 | 10/2020 | Chen et al. | |
| 2020/0372105 | A1 | 11/2020 | Gerges et al. | |
| 2022/0083725 | A1* | 3/2022 | Pande | G06F 40/216 |
| 2023/0325590 | A1* | 10/2023 | Shevchenko | G06N 5/04 715/200 |

OTHER PUBLICATIONS

Wordsworth Concise English Dictionary definition of elegant.*

Oxford American Desk Dictionary definition of elegant.*

"Dale-Chall Readability Formula", Retrieved From: https://en.wikipedia.org/wiki/Dale%E2%80%93Chall_readability_formula, Retrieved Date: Nov. 12, 2020, 2 Pages.

"Dyslexia: What Brain Research Reveals About Reading", Retrieved From: http://www.ldonline.org/article/10784/#:~:text=Did%20you%20know%20that%3A, services%20for%20a%20reading%20disorder., Retrieved Date: Nov. 12, 2020, 4 Pages.

"Flesch-Kincaid Readability Tests", Retrieved From: https://en.wikipedia.org/wiki/Flesch%E2%80%93Kincaid_readability_tests, Retrieved Date: Nov. 12, 2020, 6 Pages.

"Fry Readability Formula", Retrieved From: https://en.wikipedia.org/wiki/Fry_readability_formula, Retrieved From: Nov. 12, 2020, 1 Page.

"Grammarly", Retrieved from: https://www.grammarly.com/, Retrieved on: Jul. 17, 2019, 4 Pages.

"Gunning Fog Index", Retrieved From: https://en.wikipedia.org/wiki/Gunning_fog_index, Retrieved From: Nov. 12, 2020, 3 Pages.

"Readability", Retrieved From: https://en.wikipedia.org/wiki/Readability#McLaughlin's_SMOG_formula, Retrieved From: Nov. 12, 2020, 16 Pages.

"Repetition Detector 2", https://web.archive.org/web/20191222040718/http://www.repetition-detector.com/, Dec. 22, 2019, 2 Pages.

Bolton, Anna, "Great Readability. Better Engagement. More Conversions.", Retrieved From: https://readable.com/, Retrieved From: Nov. 12, 2020, 10 Pages.

Colmer, Ruth, "Creating Readability Formulas for Non-English Languages: The Problem of the Syllable", Retrieved From: https://readable.com/blog/creating-readability-formulas-for-non-english-languages-the-problem-of-the-syllable/, Dec. 20, 2017, 11 Pages.

"International Search Report and Written Opinion Issued in PCT Application No. PCT/US2020/028173", Mailed Date: Jul. 31, 2020, 12 Pages.

Putze, et al., "Automatic Classification of Auto-correction Errors in Predictive Text Entry Based on EEG and Context Information", In Proceedings of the 19th ACM International Conference on Multimodal Interaction, Nov. 13, 2017, 9 Pages.

Rello, et al., "Frequent Words Improve Readability and Short Words Improve Understandability for People with Dyslexia", In Book of IFIP Conference on Human-Computer Interaction, Sep. 2, 2013, 19 Pages.

"Final Office Action Issued in U.S. Appl. No. 16/420,857", Mailed Date: May 20, 2021, 34 Pages.

"Non-Final Office Action Issued In U.S. Appl. No. 16/420,857", Mailed Date: Dec. 28, 2020, 24 Pages.

"Non Final Office Action Issued in U.S. Appl. No. 16/420,857", Mailed Date: Aug. 31, 2021, 19 Pages.

"Hemingway Help", Retrieved from: https://web.archive.org/web/20201203111751/https://hemingwayapp.com/help.html, Dec. 3, 2020, 4 Pages.

"How to Use Hemingway Editor for Self-Editing Your Writing", Retrieved from: https://www.youtube.com/watch?v=ddaBulzinUs, Feb. 13, 2019, 3 Pages.

"Final Office Action Issued in U.S. Appl. No. 16/420,857", Mailed Date: Feb. 1, 2022, 33 Pages.

"International Search Report and Written Opinion Issued in PCT Application No. PCT/US21/061308", Mailed Date: Mar. 25, 2022, 15 Pages.

Proulx, et al., "Creating Consumer Friendly Health Content: Implementing and Testing a Readability Diagnosis and Enhancement Tool", In Proceedings of 46th Hawaii International Conference on System Sciences, Jan. 7, 2013, pp. 2445-2453.

* cited by examiner

Prescriptive Content Readability Recommendation Tool — 710

The prescriptive Content Readability Recommendation Tool enables you to select one or more readability indices to use in evaluating your writing. The tool provides a real-time score of your writing on each index you choose, highlights sentences that exceed your indicated target level, and provides sentence-level options for rewording text to meet your target readability level.

[Back] [Next]

Readability Indices — 720

Please review the following information about the readability indices available as part of the Prescriptive Content Readability Recommendation Tool.

- Flesch-Kincaid Grade Level – interprets readability relative to the US education grade level
- Flesh Reading Ease – consists of a 0 to 100 scale, with higher scores indicating greater ease of reading.
- etc.

[Back] [Next]

Readability Index Selection — 730

Please select one or more readability indices you would like to use for your writing.

- ☒ Flesch-Kincaid Grade Level
- ☐ Flesh Reading Ease
- ☐ Fry Readability Graph
- ☐ SMOG Formula According to <u>The Literacy Project</u>, the average American reads at the 7$^{th}$ to 8$^{th}$ grade level.

[Back] [Next]

Score Specification — 740

Please select the grade level for application of the Flesch-Kincaid Grade Level Readability Index

- ☐ 5$^{th}$ Grade
- ☐ 6$^{th}$ Grade
- ☐ 7$^{th}$ Grade
- ☒ 8$^{th}$ and 9$^{th}$ Grade
- ☐ 10$^{th}$ to 12$^{th}$ Grade
- ☐ College
- ☐ College Graduate
- ☐ Professional

[Back] [Next]

Settings — 750

Would you like to see how all your Recent and Pinned documents perform on your selected index and score?  Yes   No Would you like to apply these settings to the current document or to this document and all future documents created on this machine?

- ☐ Current Document Only
- ☐ Current and Future

[Back] [Done]

SYSTEM FOR ANALYZING AND PRESCRIBING CONTENT CHANGES TO ACHIEVE TARGET READABILITY LEVEL

BACKGROUND

Writing is hard. Reading levels are declining, dyslexia rates in the United States are estimated at 10% (affecting approx. 43.5M people), and more written information is being communicated than at any time in history. Successfully conveying ideas and resonating with the reader is challenging. In a time when each piece of writing is meant for a specific audience and purpose, current word processing tools limit support to correctly spelled words and alignment with simple grammar conventions.

Indeed, existing writing re-wording tools provide recommendations in isolation, without the cohesive and comprehensive aim of elevating or decreasing the aggregate reading score of a document to support the author's purpose and target audience. A document with correctly spelled words and sentences that meet canned grammar rules are of little value in a document that is beyond the grasp of its intended audience. Every piece of writing is meant for a specific audience. A writer intending to communicate with a particular audience should consider that audience's likely reading level. Missing this key point will make all the correctly spelled words and adhered-to grammar rules moot. Accordingly, there is a critical need for long-standing readability indices to be provided in a way that can aid every writer and reader.

BRIEF SUMMARY

A Prescriptive Content Readability Recommendation (PCRR) Tool as described herein turns standard readability analyses into easy-to-use, action-based aids to help writers (and readers) attain desired readability levels.

A system for analyzing and prescribing content changes to achieve target readability level evaluates a readability score for a file at least at a whole document level and a sentence level based on a designated readability index; identifies one or more sentences that contribute to the file having the whole document level readability score outside a desired readability score of the readability index; provides a visual indicator for each of the identified one or more sentences; and re-evaluates the readability score for the file at the whole document level upon at least one of the identified one or more sentences being changed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 illustrates an example operating environment of a prescriptive content readability recommendation tool.

FIG. 7 illustrates a work flow of a simple interface for setting up a PCRR tool.

DETAILED DESCRIPTION

Figure 1:
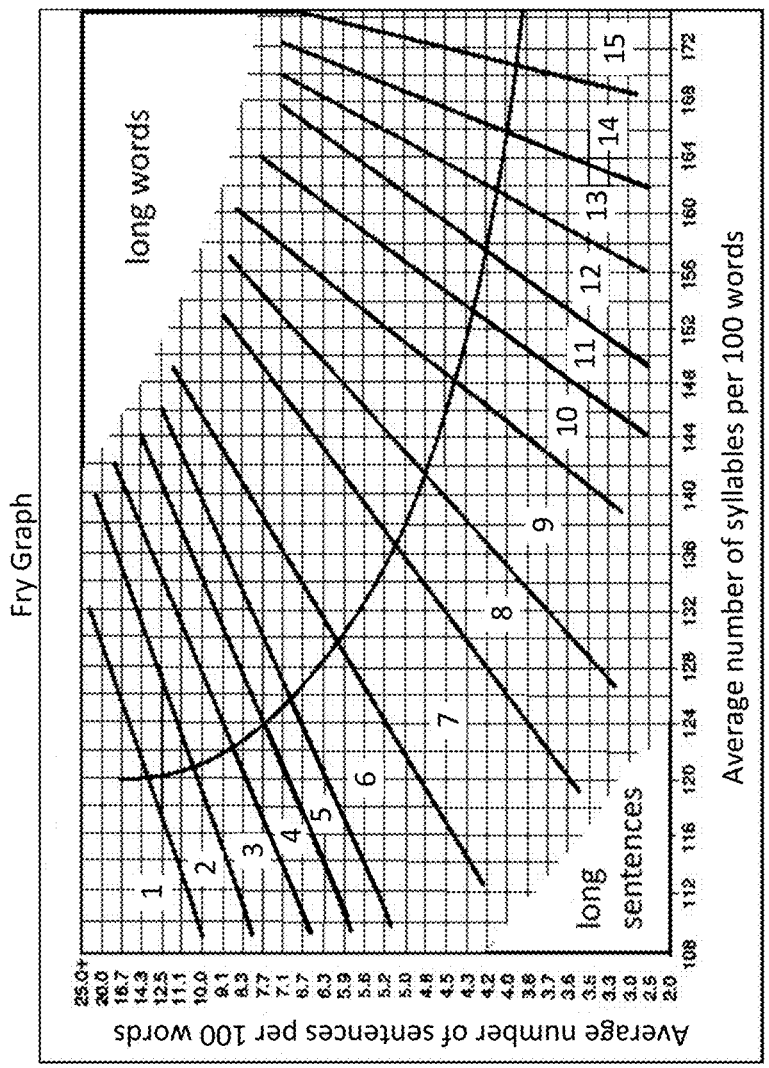
FIG. 1 illustrates a Fry graph.

A Prescriptive Content Readability Recommendation (PCRR) Tool as described herein turns standard readability analyses into easy-to-use, action-based aids to help writers (and readers) attain desired readability levels. Advantageously, the tool can function both as a coach and as a tool to apply to writing.

The tool is prescriptive for content readability by recommending how words should be used, using a set of imposed rules. Here, the rules are based on one or more readability indices.

"Readability" is the ease with which a reader can understand a written text. In natural language, the readability of text depends on its content (the complexity of its vocabulary and syntax) and its presentation (such as typographic aspects like font size, line height, character spacing, and line length). Researchers have used various factors to measure readability, such as speed of perception, perceptibility at a distance, perceptibility in peripheral vision, visibility, reflex blink technique, rate of work (reading speed), eye movements; and fatigue in reading. The described tool can use any available readability test including one or more of the known readability scoring algorithms.

Higher readability eases reading effort and speed for any reader, but it is especially important for those who do not have high reading comprehension and those with reading challenges, such as dyslexia. In readers with average or poor reading comprehension, raising the readability level of a text from mediocre to good can make the difference between success and failure of the communication goals for the text.

A prescriptive content readability recommendation tool can provide a real-time readability index score of a person's writing, provide indicators for a creation or consumption application to highlight sentences that exceed a target readability level, and provide sentence-level options for rewording text to meet the target readability level.

As mentioned above, one or more readability indices can be used to evaluate a document's readability. These readability indices may include the Flesch-Kincaid readability tests, Gunning fog index, Dale-Chall readability formula, Fry graph readability formula, and the SMOG grade.

The Flesch-Kincaid readability tests are readability tests designed to indicate how difficult a passage in English is to understand. There are two tests, the Flesch Reading Ease, and the Flesch-Kincaid Grade Level.

In the Flesch Reading Ease test, higher scores indicate material that is easier to read; lower scores indicate material that is more difficult to read. The formula for the Flesch Reading Ease Score (FRES) test is:

$$206.835 - 1.015\left(\frac{\text{total words}}{\text{total sentences}}\right) - 84.6\left(\frac{\text{total syllables}}{\text{total sentences}}\right).$$

In the Flesch-Kincaid Grade Level test, the score corresponds to a U.S. grade level. The formula for the Flesch-Kincaid grade level test is:

$$0.39\left(\frac{\text{total words}}{\text{total sentences}}\right) + 11.8\left(\frac{\text{total syllables}}{\text{total words}}\right) - 15.59.$$

In linguistics, the Gunning fog index is a readability test for English writing. The index estimates the years of formal education a person needs to understand the text on the first reading. Texts for a wide audience generally need a fog index less than 12. Texts requiring near-universal understanding generally need an index less than 8.

The Gunning fog index is calculated with the following algorithm:
1. Select a passage (such as one or more full paragraphs) of around 100 words. Do not omit any sentences;
2. Determine the average sentence length. (Divide the number of words by the number of sentences);
3. Count the "complex" words consisting of three or more syllables. Do not include proper nouns, familiar jargon, or compound words. Do not include common suffixes (such as -es, -ed, or -ing) as a syllable;
4. Add the average sentence length and the percentage of complex words; and
5. Multiply the result by 0.4.

The complete formula is:

$$0.4\left[\left(\frac{\text{words}}{\text{sentences}}\right) + 100\left(\frac{\text{complex words}}{\text{words}}\right)\right].$$

The Dale-Chall readability formula is a readability test that provides a numeric gauge of the comprehension difficulty that readers come upon when reading a text. This test uses a curated list of 3000 words to determine whether a word is difficult or not. The formula is given as:

$$0.1579\left(\frac{\text{difficult words}}{\text{words}} \times 100\right) + 0.0496\left(\frac{\text{words}}{\text{sentences}}\right).$$

The words in the list of 3000 words are considered to be reliably understood by groups of fourth-grade American students.

The Fry graph readability formula is a readability metric that indicates a grade reading level using a Fry graph, such as shown in FIG. 1. The grade reading level (or reading difficulty level) is calculated by the average number of sentences (y-axis) and syllables (x-axis) per hundred words. These averages are plotted onto the Fry graph (e.g., shown in Figure). The intersection of the average number of sentences and the average number of syllables determines the reading level of the content.

In general, the fry graph readability formula involves the following steps:
Step 1: Select 3 samples of 100-word passages randomly (eliminate the numbers from word count).
Step 2: Count the number of sentences in all three 100-word passages, estimating the fraction of the last sentence to the nearest 1/10th.
Step 3: Count the number of syllables in all three 100-word passages. Make a table as follows:

| | Number of Sentences | Number of Syllables |
|---|---|---|
| First 100 words | | |
| Second 100 words | | |
| Third 100 words | | |
| Total | | |
| Average | | |

Step 4: Enter the graph with Average Sentence Length and Number of Syllables, plotting where the two lines intersect. The area that the plot is located signifies the approximate reading grade level of the content.
Step 5: Additional sample counts (e.g., fourth 100 words, fifth 100 words, etc.) can be included in the average when there is significant variability.

The SMOG grade is a measure of readability that estimates the years of education needed to understand a piece of writing. SMOG is an acronym for "Simple Measure of Gobbledygook".

To calculate SMOG:
1. Count a number of sentences (at least 30).
2. In those sentences, count the polysyllables (words of 3 or more syllables); and
3. Calculate using $$\text{grade} = 1.0430\sqrt{\text{number of polysyllables} \times \frac{30}{\text{number of sentences}}} + 3.1291.$$

A simplified approximate formula commonly used is given as:
1. Count the number of polysyllabic words in three samples of ten sentences each;
2. Take the square root of the nearest perfect square; and
3. Add 3.

In some cases, a user may select which index and target score that they would like to use for a particular document or for all documents authored in the application connected to the PCRR tool. Moreover, the described PCRR tool not only measures and displays the readability of content using readability formulas such as Flesch-Kincaid Grade Level, Flesch Reading Ease, and Fog Index, the described tool identifies what part of a document is increasing the readability score and how to improve it. The solution is prescriptive not just in identifying individual sentences within a document that are increasing reading difficulty, but in suggesting alternative wording and sentence length—with associated readability levels. This enables an author to explicitly achieve a target readability scores to meet the needs of their audiences.

Figure 2:
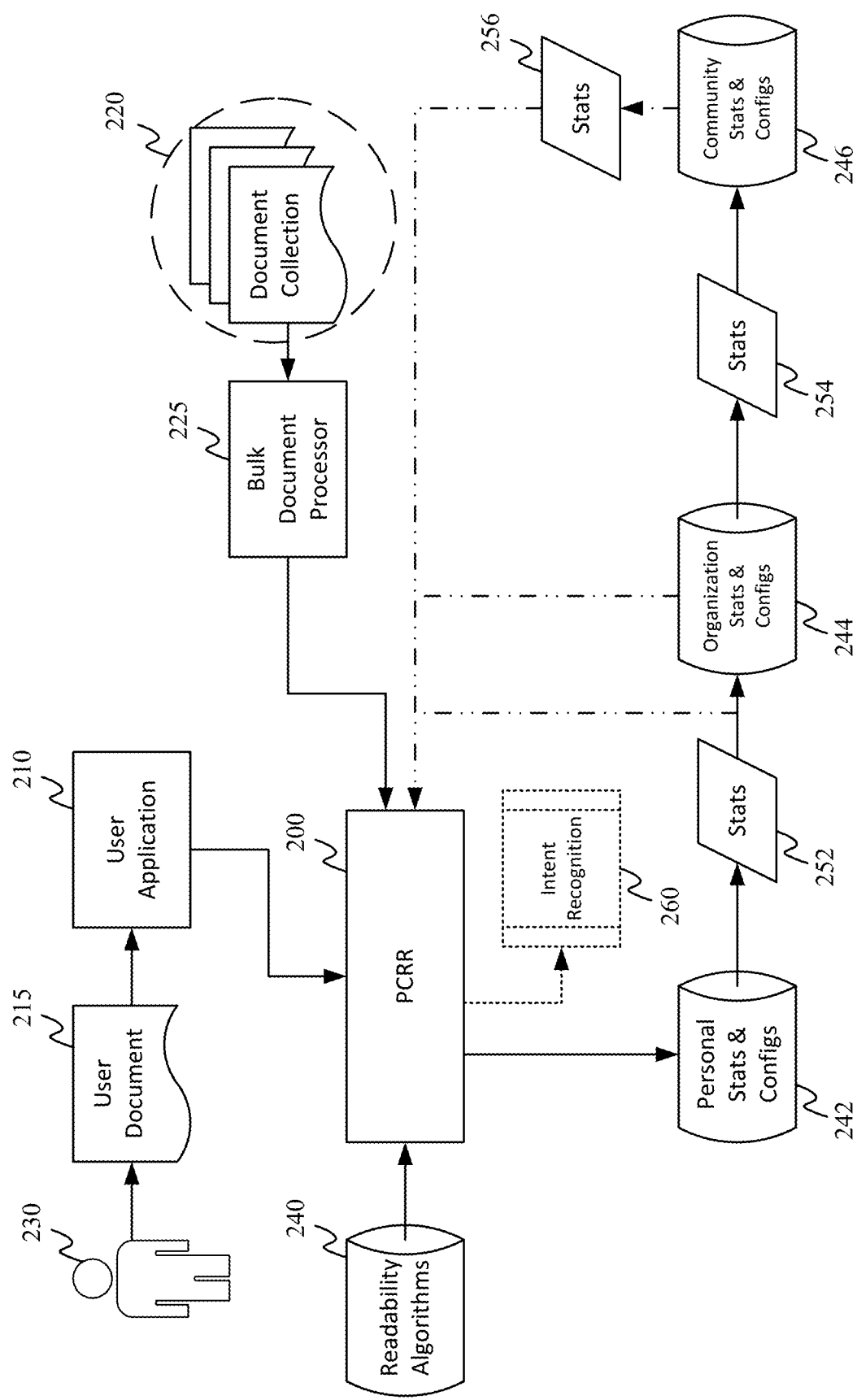
FIG. 2 illustrates an example architecture of a prescriptive content readability recommendation tool of a system for analyzing and prescribing content changes to achieve target readability level.

FIG. 2 illustrates an example architecture of a prescriptive content readability recommendation tool of a system for analyzing and prescribing content changes to achieve target readability level. Referring to FIG. 2, a prescriptive content readability recommendation (PCRR) tool 200 can be in the form of a plugin or be built-in to a user application 210. The PCRR tool 200 is the engine that applies various readability scoring algorithms to an input document 215. The PCRR tool 200 can analyze many types of input documents 215. Additionally, PCRR can analyze entire collections 220 of documents at once using a bulk processor 225. Examples of types of input documents that may be analyzed by the PCRR tool 200 include, but are not limited to, ascii text, xml, pdf, and docx. These files can be considered content files having text content.

Text content of a file refers to the symbols, letters, numbers, words, phrases, sentences, and paragraphs in the file. A unit block of text content refers to a particular unit of text such as word, sentence, paragraph, and, in some cases, page. The available units of text for a file can depend on the file format. For example, certain file formats include tags signifying a particular unit of text. For a given file, identification of text content can involve a variety of mechanisms depending on the file format of the file. For example, a hypertext mark-up language (HTML) file can include tags indicating the units of text content. In a text file (e.g., without tags), units of text content may be identified using syntactic analysis. The syntactic analysis can be carried out by a syntax analyzer or parser that analyzes the token stream (representing the text, including punctuation and spaces of the file) against syntax rules. The syntactic analysis can be based on W3C standards. In some cases, word categorization can be performed to identify whether the text (characters) is a word, number, email address, or other predetermined category. The syntactic analysis (along with text characterization to assist with identifying units of text) further allows for the identification of boundaries of words and sentences in the file. The identified boundaries can then be used to apply visual indicators (e.g., when displaying unit blocks that are recommended to be changed) as well as for replacement (e.g., with a rewrite).

While a sentence can be identified by end punctuation, a paragraph is a single sentence or a group of sentences forming a unit. A paragraph may be visually identified by a break in lines and may be semantically identified by a sentence or group of sentences directed to a topic or main idea. A parser may use the metadata of the file, for example, by identifying paragraph marks and line breaks.

The PCRR tool 200 can be in communication with a readability algorithm data store 240 and, in some cases, various statistics and configuration data stores such as a personal statistics and configuration data store 242, organization statistics and configuration data store 244, and community statistics and configuration data store 246. The readability algorithm data store 240 can store and provide a set of algorithms that the PCRR tool 200 may use. The set of readability algorithms can include any of the readability algorithms described above and is extensible via the readability algorithms data store 240. This external store allows the PCRR tool 200 to add new algorithms over time.

The statistics and configuration data stores (e.g., stores 242, 244, 246) can store statistics about readability levels associated with different intended document audiences. PCRR tool 200 can use these statistics to improve on its suggestions to the user 230 about how to improve the user's document's readability. The PCRR tool 200 can use the user's personal statistics 252 to inform the user 230 about readability trends of their own documents and potentially similar documents written by other authors in their organization (as part of organization statistics 254) and across industries (e.g., as part of community statistics 256).

The PCRR tool 200 can utilize machine learning and an increasing volume of readability statistics data (e.g., from statistics 252, 254, 256) to improve the tool's readability scoring and recommendations over time. In addition, by categorizing documents into audience types, PCRR can customize its machine learning algorithm for each audience.

The configuration data stored as part of the statistics and configuration data stores can include information about readability standards preferred by individual authors, organizations, and industries. The configuration data allows organizations to set standards for their authors. It also allows organizations to adopt standards that are valuable to others in their industry.

As mentioned above, when the PCRR tool 200 is in the form of a plugin, the plugin can be embedded in end-user tools that have a software development kit (SDK). For applications that do not supply an SDK, but publish their storage format, the PCRR tool 200 can also analyze documents with published specifications by reading directly from the appropriate storage sources.

When a user 230 enables the PCRR tool 200 within their application 210, the user 230 can specify the purpose type of the document they want to author. A "purpose type" refers to the target audience for content. By specifying the purpose type of the document, the PCRR tool 200 can use that information to recommend specific readability scoring methods appropriate for the target audience. In some cases, the purpose type can be inferred by the PCRR tool 200 using intent recognition AI algorithms 260 and recommendations for purpose type may be provided to the user 230 for selection or confirmation.

The PCRR tool 200 can include an option to auto-scan all previous documents written in the user's recent and pinned history and provide an overview of how each document scores on the available indices. An author can improve their writing over time and this history can be provided, for example, via a dashboard. For example, the PCRR tool can store the writing score for each document, along with its last modified date and time, to provide a "readability curve" by which the user can see how their writing performs over time.

Figure 3:
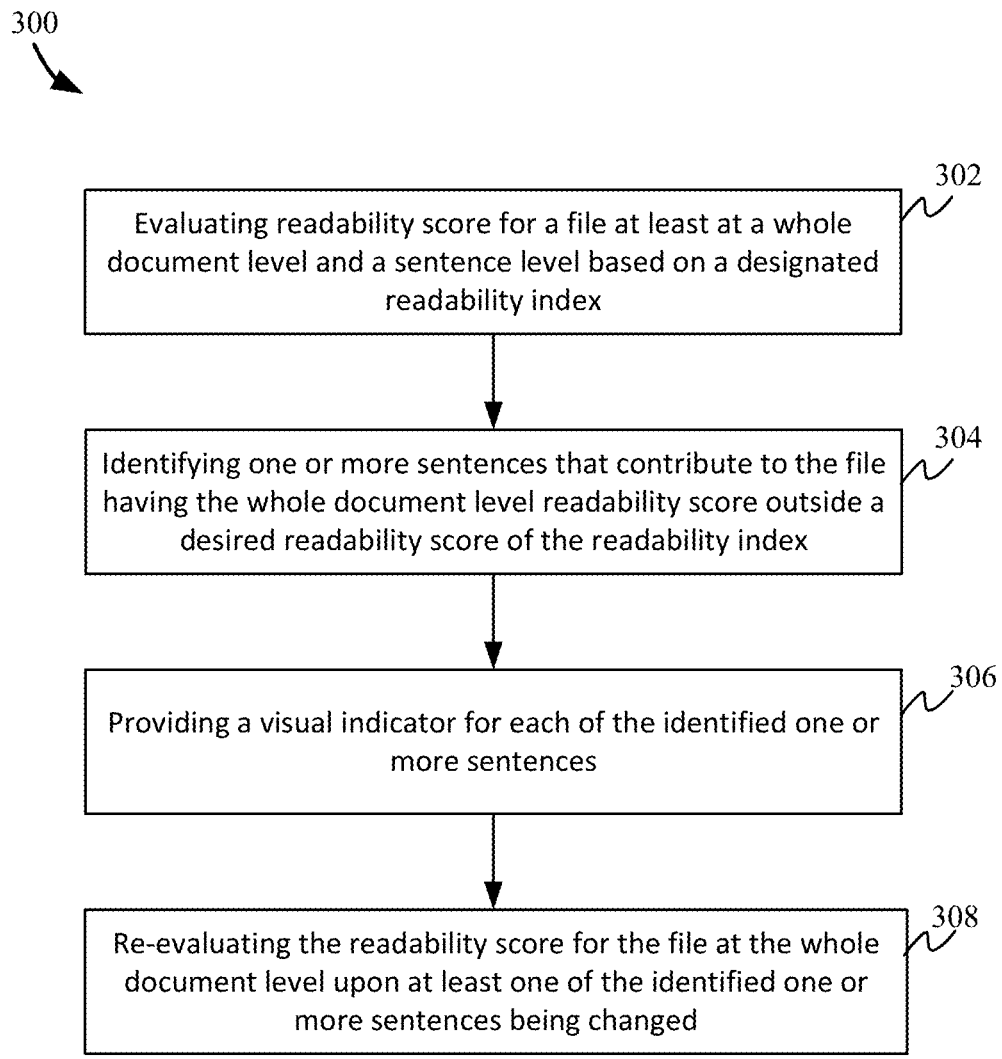
FIG. 3 shows a method for analyzing and prescribing content changes to achieve a target readability level.
Figure 4:
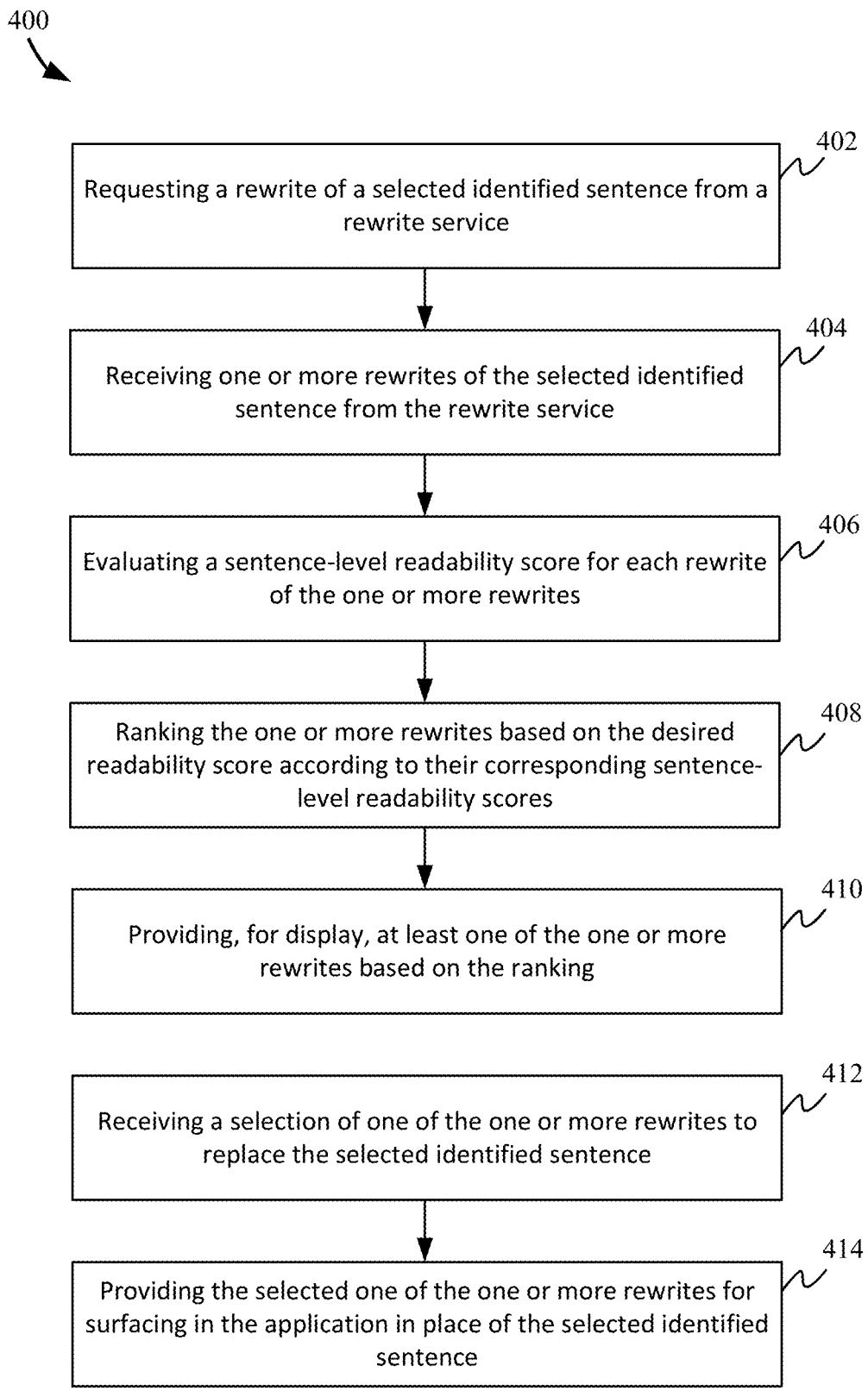
FIG. 4 shows a method for recommending prescriptive content.
Figure 5:
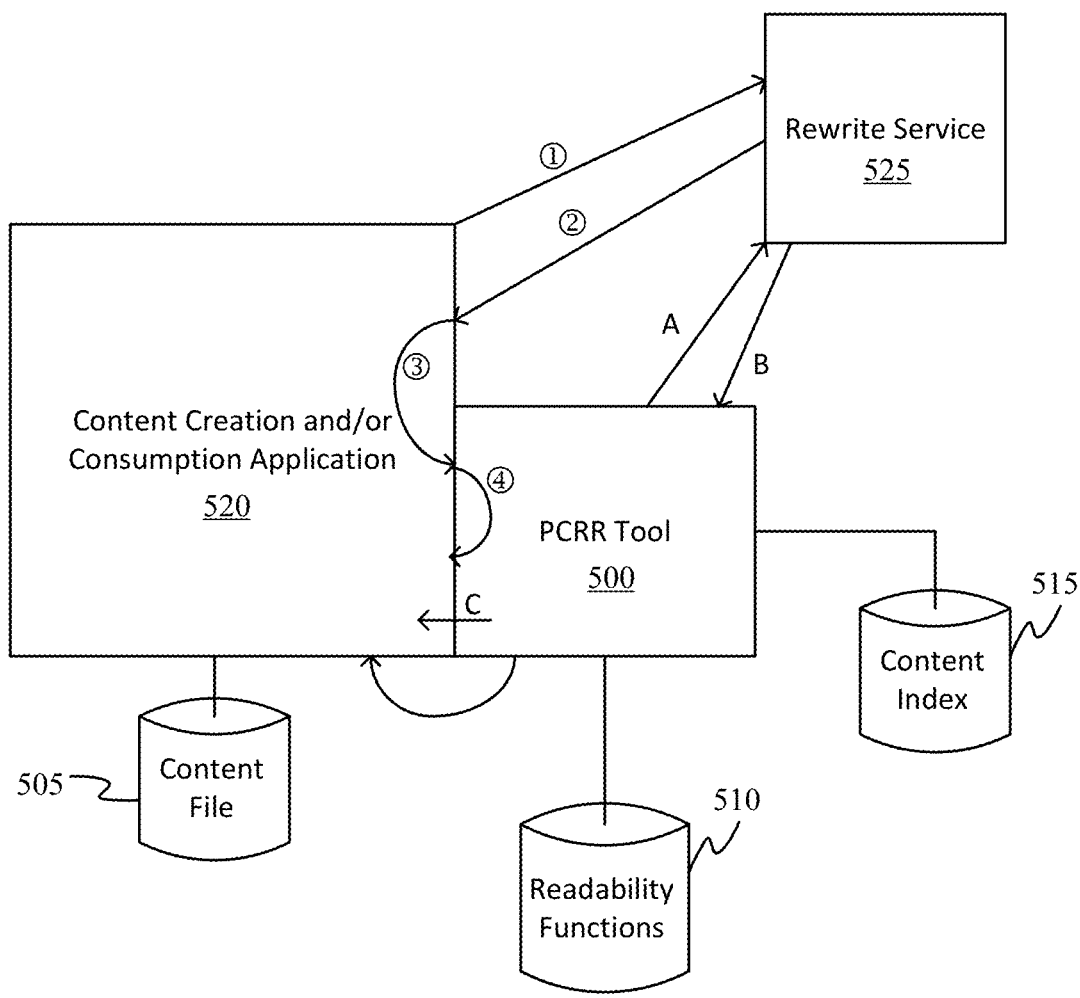
FIG. 5 shows a representational diagram for a prescriptive content readability recommendation tool.

FIG. 3 shows a method for analyzing and prescribing content changes to achieve a target readability level; FIG. 4 shows a method for recommending prescriptive content; and FIG. 5 shows a representational diagram for a prescriptive content readability recommendation tool. Referring to FIGS. 3 and 5, a PCRR tool 500 can include instructions that direct a computing system to perform method 300 that includes evaluating (302) a readability score for a file 505 based on a designated readability index. The algorithm for the designated readability index can be retrieved from a readability function resource 510 and may include any of the readability algorithms described above. The readability index may be selected ahead of time, for example, in a process flow such as described with respect to FIG. 7.

The evaluation is carried out at least at both a whole document level and a sentence level for the content file 505. In some cases (such as when the text file supports such a unit block), a paragraph level evaluation can also be performed. When evaluating a file, a content index 515 can be created and updated that stores the readability score for the whole file, the readability values for paragraphs (when included in the evaluation), and readability values for sentences. The tool 500 can manage the index and perform operations including, read, write (including update), sort, and rank.

The evaluating step can be triggered by a command trigger (e.g., performed directly in response to a command) or can be triggered as part of a start-up process when a content file 505 is opened in a content creation and/or consumption application 520. In some cases, the evaluating step is triggered upon receiving end punctuation from user input (e.g., the end punctuation is the trigger to evaluate the document and the sentence and optionally the paragraph). This can allow for readability score(s) to be updated in real-time as a content creator is generating new content (e.g., by typing or dictating to the content creation application 520). Evaluations can occur while content is being created—as each sentence is written—or when revising/editing the content file 505. In some cases, the tool 500 monitors user input to a canvas of an application for the trigger.

The evaluating step can run continuously, periodically, or upon each new trigger, in a background while a user is consuming or creating content of a file 505 while within a content creation or consumption application 520.

The method 300 further includes identifying (304) one or more sentences that contribute to the file having the whole document level readability score outside a desired readability score of the readability index. This may be accomplished by calculating, for each sentence, the difference between that sentence's score and the desired readability score. Here, both sentences that are higher and lower than the desired readability score are identified. Of course, in some implementations, only those sentences with a positive difference or only those sentences with a negative difference can be identified as being a sentence that contributes to the file having the readability score outside the desired readability score. Alternatively, the content index 515 can be sorted by the scores for the sentences from highest to lowest or ranked by how high the score is (or how low the score is) from the desired readability score.

The PCRR tool 500 then provides (306) a visual indicator for each of the identified one or more sentences (as identified in operation 304). The sentences having a score above a threshold that can correspond to the desired readability score can have one type of visual indication while the sentences having a score below the threshold can have a different type of visual indication applied. The visual indicator can be surfaced for display by the content creation or consumption application 520. In some cases, the visual indicator is a highlighting of a sentence (as a background color, underline, bold, or other visual distinction). In some cases, the highlighting can be turned on and off in response to selection of a command by the user. In some cases, the visual indicator is a value displayed when a cursor is in the sentence. The value may be displayed in context with the sentence, in a reviewing pane, on a status bar, or any other suitable area for display. Of course, both highlighting and a displayed value can be provided, depending on implementation. In some cases, the content creation application 520 surfaces values for all unit blocks evaluated.

By providing the visual indication of a sentence contributing adversely to the desired readability score, a content creator can change the sentence by modifying the sentence themselves via an editing tool or replacing the sentence with another sentence, such as provided by a rewrite service that provides suggested rewrites for content.

A "rewrite" refers to a suggested phrase, clause, or sentence to replace an existing one and is expected to have semantic similarity to the text the rewrite is replacing. Machine learning algorithms may be used to learn and generate rewrites. In some cases, the training corpus is based on content from a particular enterprise for use by that enterprise. In some cases, the training corpus is based on a user's own work or work from publicly available sources.

The PCRR tool 500 then re-evaluates (308) the readability score for the file at the whole document level upon at least one of the identified one or more sentences being changed. The evaluation can be carried out such as described with respect to operation 302.

As mentioned, the identified sentences and/or paragraphs can be rewritten by a content creator or a rewrite can be requested. For the case where a rewrite service 525 is available, a method 400, such as illustrated in FIG. 4, can be performed. The method 400 can include requesting (402) a rewrite of a selected identified sentence from a rewrite service 525; receiving (404) one or more rewrites of the selected identified sentence from the rewrite service 525; and evaluating (406) a sentence-level readability score for each rewrite of the one or more rewrites. The evaluation can be carried out using the designated readability index such as described with respect to operation 302 of FIG. 3. As illustrated in FIG. 5, the request may be from the application 520 (as ①), which receives the rewrites (as ②) and sends (as ③) to the PCRR tool 500 for evaluation (and other processes). Alternatively, the request may be from the PCRR tool 500 (as A), which receives the rewrites (as B) and performs the evaluation. In some cases, the PCRR tool 500 can automatically select content and request rewrites for the selected content (directly or via the application 520).

The method 400 continues with ranking (408) the one or more rewrites based on the desired readability score according to their corresponding sentence-level readability scores; and providing (410), for display, at least one of the one or more rewrites based on the ranking. As reflected in the illustration in FIG. 5, the PCRR tool 500 can provide the ranked rewrites to the application 520 for display (as ④ and C). The application 520 can receive (412) a selection of a rewrite from the displayed one or more rewrites to replace the selected identified sentence; and provide (414) the selected one of the one or more rewrites for surfacing in the application in place of the selected identified sentence. This replacement can trigger operation 308 of FIG. 3.

An application with a tool performing methods 300 and 400 can run in the background and constantly display the score for the content file at any given point. With the click of a button, the tool can be used to highlight sentences that exceed a target readability level. The author can choose to hover over each highlighted sentence, at which point the author can be presented reworded options that meet or surpass the target readability level. When such a choice is selected by the author, the document readability score is immediately updated. If the author does not want to go through each occurrence, they can click an "Apply Readability" button at which point the tool will select an option for each excessive score. In such a case, each change may be highlighted (e.g., in a word processing application, the change may be via track-changes), and the author may review each occurrence to ensure agreement with the option chosen by the tool.

Figure 6:
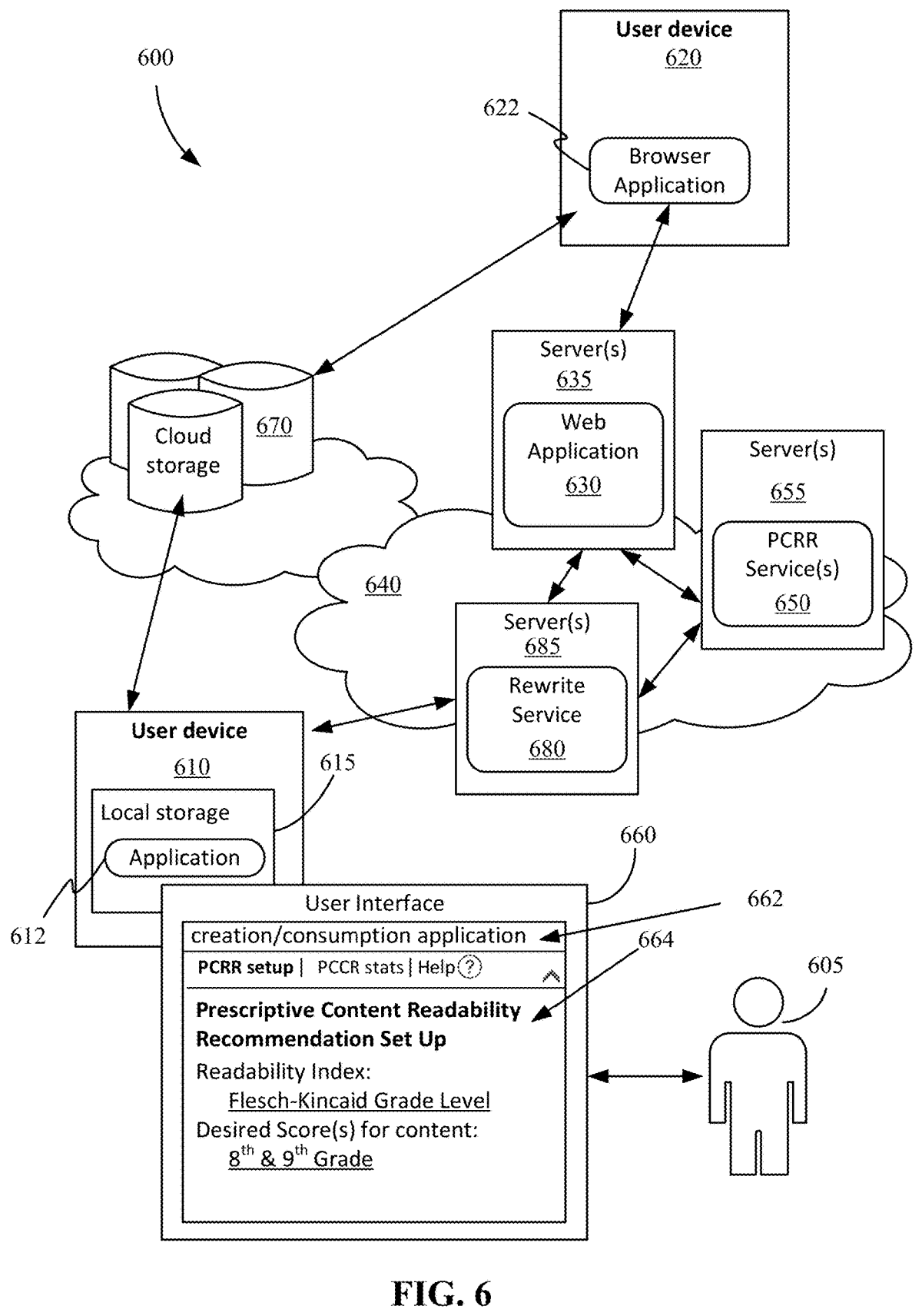

FIG. 6 illustrates an example operating environment of a prescriptive content readability recommendation tool. Referring to FIG. 6, in an operating environment 600, a user 605 can create or consume content on a computing device 610. A creation or consumption application 612, stored at local storage 615 of the computing device 610 and executed by the computing device 610, can include a PCRR tool in the form of a plug-in or built-in feature. Alternatively, a user may create or consume content on computing device 620 via a browser application 622 that renders a content creation or consumption web-application 630 available from a web server 635 over a network 640. Similar to the local content creation or consumption application 612, the web-application 630 can include a PCRR tool. In some cases, the web-application 630 communicates with a separate PCRR service 650 provided at server(s) 655. The PCRR service 650 can provide the features and functions of a PCRR tool for developers and other applications and services.

Examples of content creation applications include, but are not limited to, word processing application, presentation applications, notebook applications, social media applications. Examples of content consumption applications include, but are not limited to, reader applications and audiobook applications. Of course, most content creation applications may also be considered content consumption applications as it is possible to consume content in such applications.

Application 612 (or application 630) can provide a user interface 660 through which user 605 creates or consumes content of a file that may be stored in local storage 615 or available from cloud storage 670 (or a web resource or a cloud-based or local network enterprise resource as some other examples). In the illustrated example, the user interface 660 is a creation or consumption application interface 662 with a PCCR plug-in that can be set up to indicate a specified readability index and a target readability level (e.g., score) 664.

The PCRR tool can be used in conjunction with a rewrite service 680 available from server(s) 685 in order to provide suggestions for rewording the text of the content being created or consumed.

It should be understood that server(s) 635, 655, 685 and application 630 and service(s) 650, 680 may be provided by a single entity or by different entities.

The PCRR Tool supports numerous scenarios. In an education scenario, an instructor can tailor written information to the level of their audience (class), ensuring the content is accessible by all readers—including those with learning disabilities such as dyslexia. In another scenario, the PCRR tool can scan all documents in a user's recent and pinned history, and provide an overview of how those documents score on the various indices to allow the user to evaluate their writing and, over time, improve their ability to write more clearly for comprehension. In yet another scenario, the PCRR tool can help an organization implement goals around writing clarity and comprehension. The PCRR Tool may be augmented regularly through machine learning as the tool scans documents across an organization or word processing tool to provide anonymized readability statistics. Indeed, the tool can be deployed as far as an organization wishes to establish historical norms and benchmarks. For example, a software maker using the PCRR Tool on its documents can apply indices across all documents created within their organization in order to create aggregate index averages, ranges, etc. so that all content created within their organization can be consistently within a particular target index. The tool can also apply the same machine learning across all documents created by multiple organizations. This could provide authors details about how their writing compares to others in their organization and across multiple organizations within their domain. In yet another scenario, the PCRR tool can be used by a publisher (in conjunction with an author and editor, etc.) to generate multiple versions of a text so that a consumer can request the text having a readability score that the consumer can best understand.

FIG. 7 illustrates a work flow of a simple interface for setting up a PCRR tool. Referring to FIG. 7, a flow is shown that provides an overview of the score values within each index and allows the user to select the index of choice and the desired value for that index. The user can save these preferences for all documents created with the associated word processing tools or for an individual document. In particular, in the first screen 710, an overview is provided explaining what the PCRR tool does. Here, the overview explains the following "The prescriptive Content Readability Recommendation Tool enables you to select one or more readability indices to use in evaluating your writing. The tool provides a real-time score of your writing on each index you choose, highlights sentences that exceed your indicated target level, and provides sentence-level options for rewording text to meet your target readability level." In the second screen 720, the user is introduced to the available readability indices. In the third screen 730, the user is able to select the at least one readability index they would like to use. In the illustration, the user selected the Flesch-Kincaid Grade Level. Additional information may also be provided for the user's edification. With the selection of the Flesch-Kincaid Grade Level index, the fourth screen 740 provides the selection of the grade level. Here, the user selected $8^{th}$ and $9^{th}$ grade. The fifth screen 750 provides further settings options, including whether the user would like previously viewed or edited files to be evaluated and whether the selected settings should be applied to current document only or future documents (tied to user log-in or device).

Once the tool is setup, the tool can constantly scan the user's writing and can display summary data about the document. This data can be accompanied by a contextual map that highlights individual sentences that exceed the desired index values. In certain implementations, when the user hovers over a highlighted sentence, the user is presented with one or more auto-generated, pre-scored alternatives to achieve the desired index score for that sentence. Selecting an option immediately adjusts the document's overall readability statistics, enabling the author to continue working through the highlighted options until the document meets the desired level.

Figure 8A:
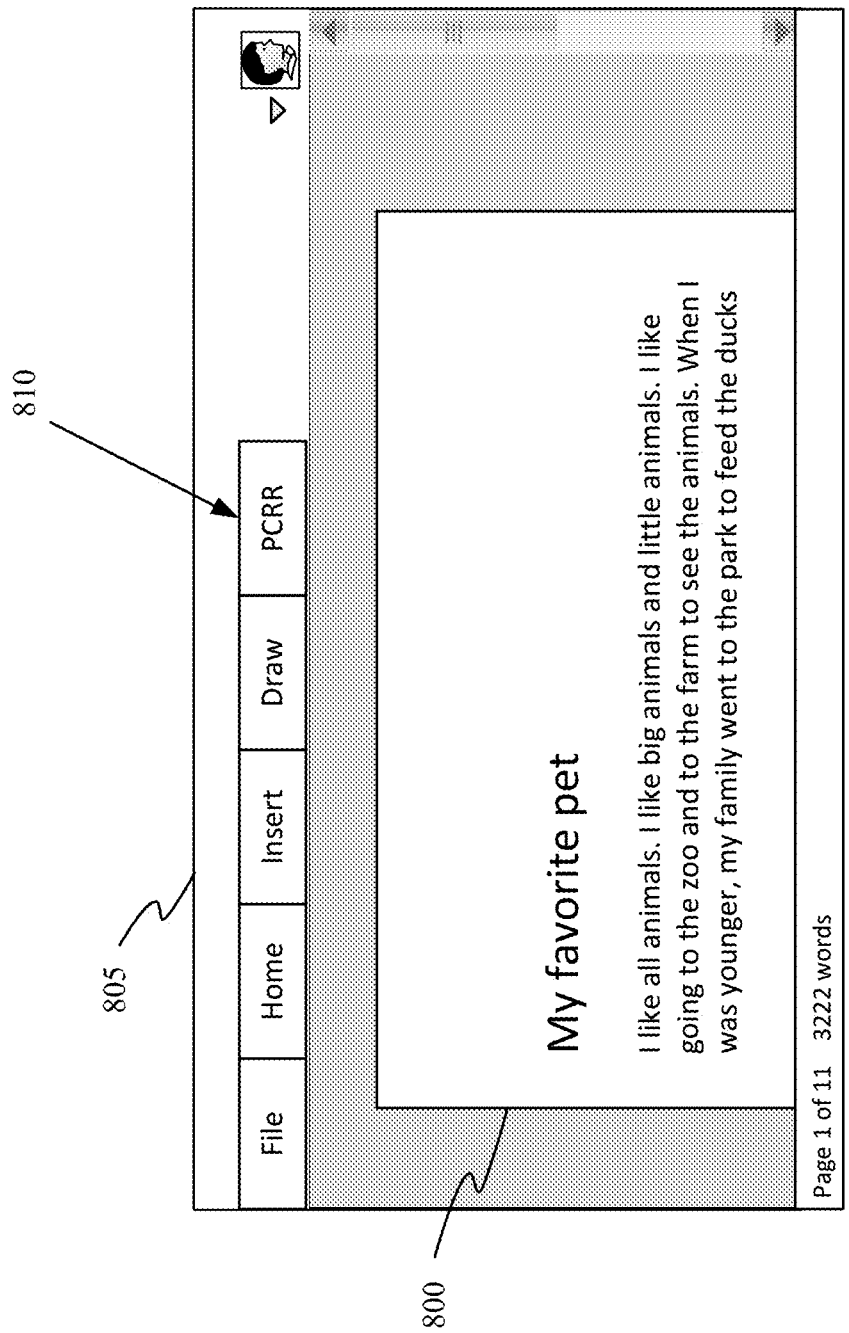
FIGS. 8A-8F illustrate a word processing scenario for a prescriptive content readability recommendation tool.

FIGS. 8A-8F illustrate a word processing scenario for a prescriptive content readability recommendation tool. Referring to FIG. 8A, in the illustrative scenario, a user opens a content file 800 in a content creation application 805 of a word processing application. Here, the content file 800 is a story intended for a wide audience and translations. Because the author wants this story to be easily translated and understood by the large audience, a PCRR tool 810 can be used to make the story consistent at a desired readability score.

Figure 8B:
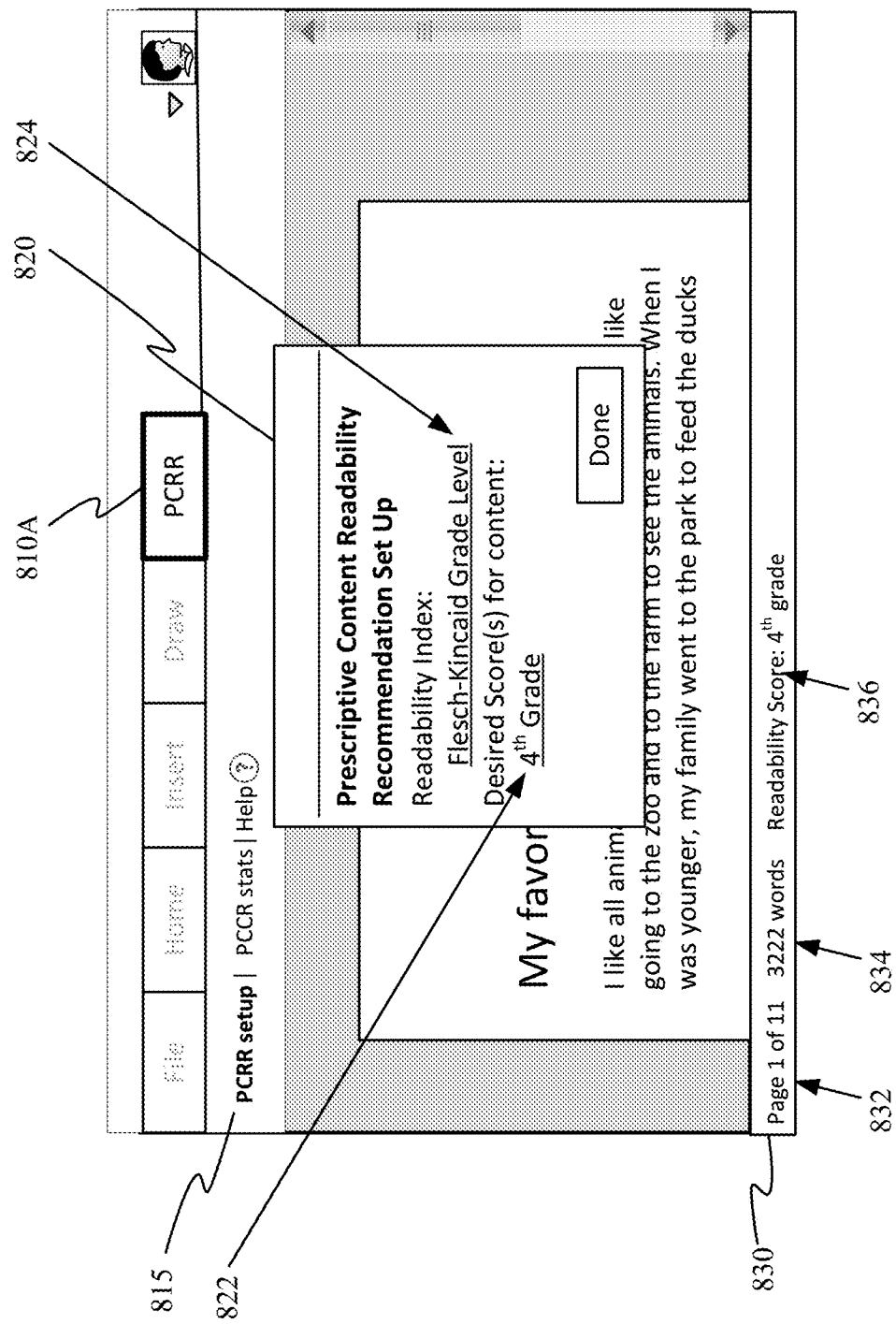

Referring to FIG. 8B, in the illustrative scenario, the user sets-up the PCRR tool via a menu option 810A for PCRR tool and setup 815, which opens a window 820, where the user may go through a flow such as illustrated in FIG. 7. Here, the PCRR tool receives an indication of a desired readability score 822 of a readability index 824 for the file, in this case, Flesch-Kincaid Grade Level of $4^{th}$ grade; and evaluates content in the file to determine a first readability score of the whole file, a sentence-level readability value for each sentence in the file, and a paragraph-level readability value for each paragraph in the file. The PCRR tool can compare each sentence-level readability value and each paragraph-level readability value to the desired readability score 822 to generate a comparison result for each sentence and paragraph. A first visual indication of the first readability score can be output, for example, on a status bar 830. As shown, the status bar 830 shows information of the number of pages 832, total number of characters 834, and the readability score (Flesch-Kincaid Grade Level of $4^{th}$ grade) 836.

Figure 8C:
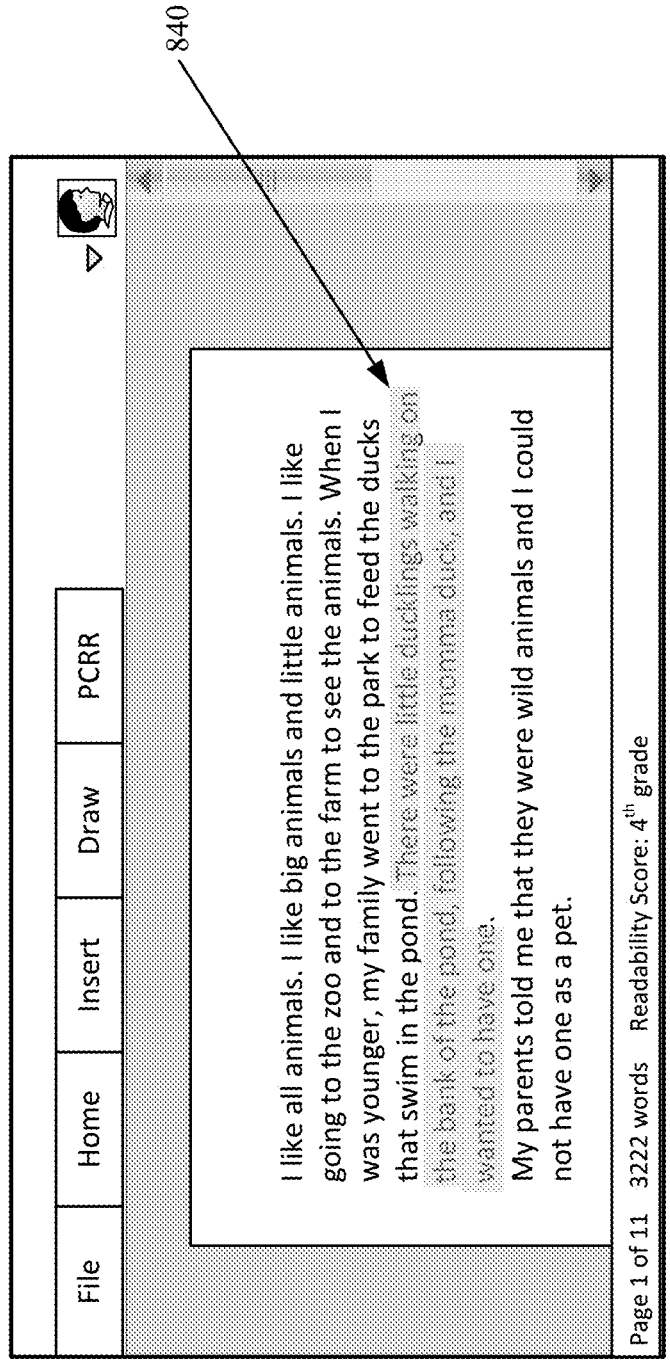

A visual flag can be assigned to each sentence or paragraph having the comparison result over a threshold value and the application can display the visual indication of highlighting and/or value automatically or in response to a selection by the user to show the sentences. Referring to FIG. 8C, the user can select (command not shown) to show the highlighting of sentences and/or paragraphs that are outside the desired score (or range of scores) for the readability index. For example, as shown in FIG. 8C, sentence 840 in the canvas of the application is highlighted.

Figure 8D:
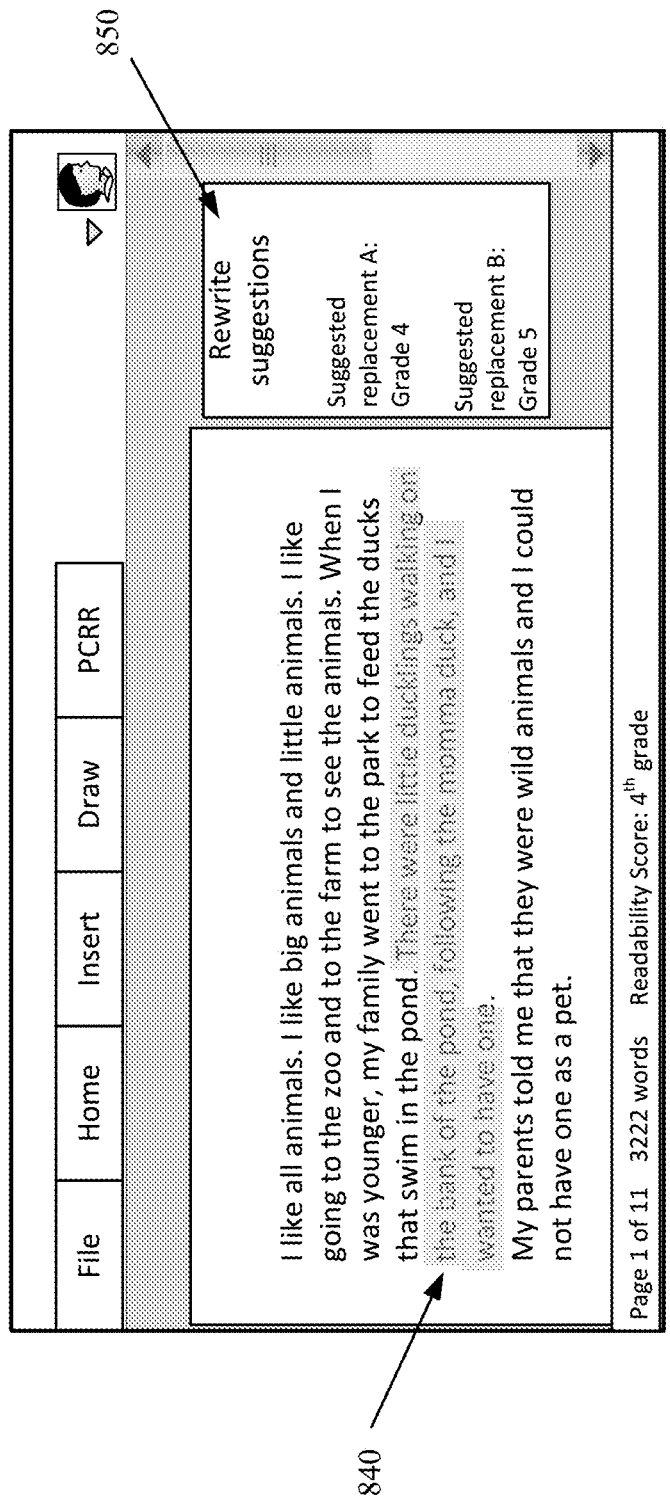
Figure 8E:
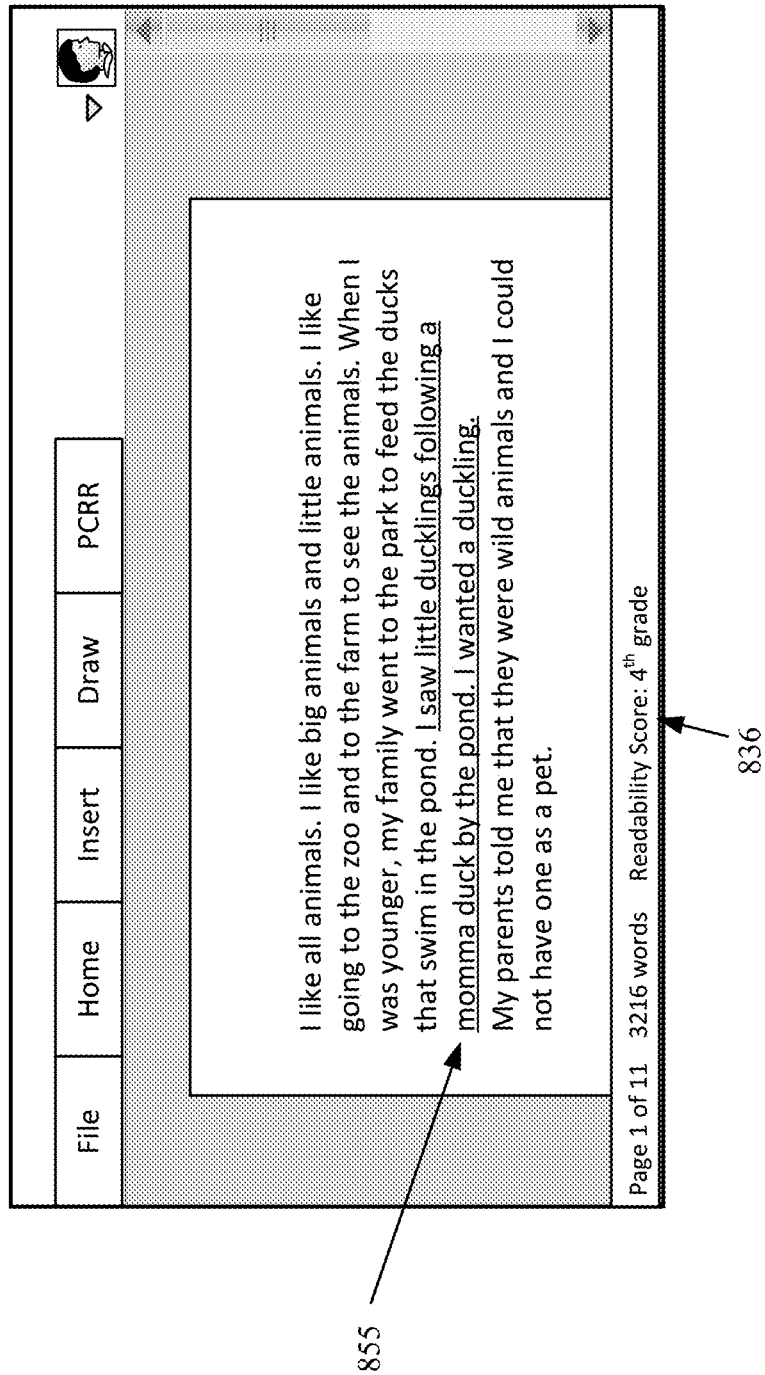

The author can modify the sentence themselves or may use a rewrite service, such as illustrated in FIG. 8D. Upon receiving a selection of a sentence having the visual flag, such as sentence 840, application/tool (via the device on which the application or tool is running) communicates with a rewrite service to obtain rewrite suggestions for the selected sentence. For each rewrite suggestion of the rewrite suggestions, the PCRR tool determines a readability value and ranks the rewrite suggestions according to their corresponding readability values with respect to the desired readability score 822. Here, a ranked set of rewrites 850 are provided for the user to select. Then, when a selection of one of the rewrite suggestions is received, the selected sentence is replaced with the selected rewrite suggestion 855 as shown in FIG. 8E. After replacing the selected sentence with the selected rewrite suggestion 855, the PCRR tool reevaluates the content to at least determine a second readability score of the whole file; and outputs a second visual indication of the second readability score, which in this case (with whole document readability score 836 of $4^{th}$ grade) did not change by the rewrite.

Figure 8F:
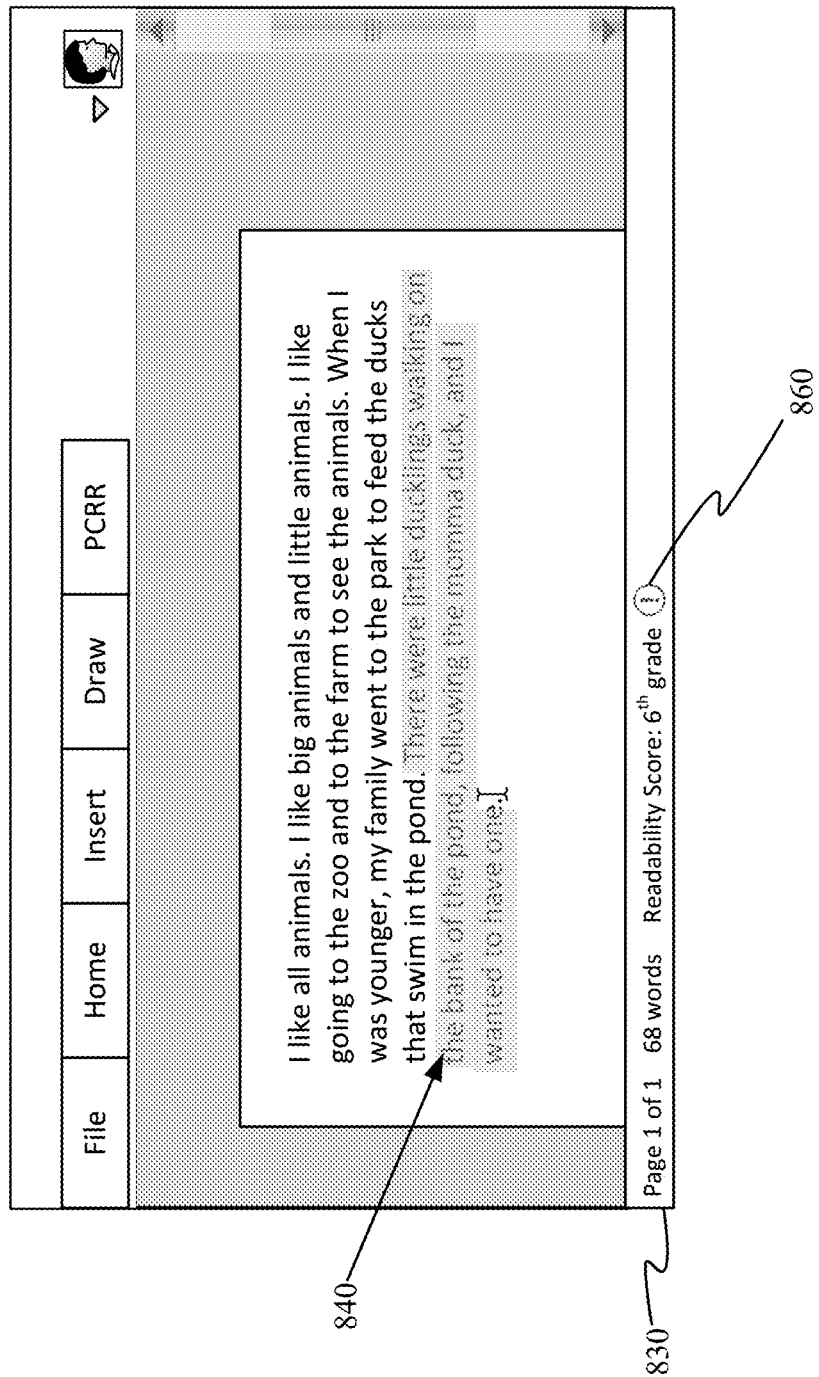

Referring to FIG. 8F, the PCRR tool can be used during the process of the user writing the story. Since the PCRR tool is running in the background, each time the user enters an end character of a sentence, the PCRR tool evaluates the readability score of at least that sentence. If the PCRR tool determines that the score of that sentence changes the score of the whole content file or even if it is determined that the score of that sentence is itself outside the desired score (or range of permissible scores), then a visual indicator can be surfaced. In the illustrated scenario, the sentence 840 is highlighted and a warning symbol 860 surfaces in the status bar 830.

Although only a single index is shown in this illustrative scenario, multiple indices may be applied and shown.

Figure 9:
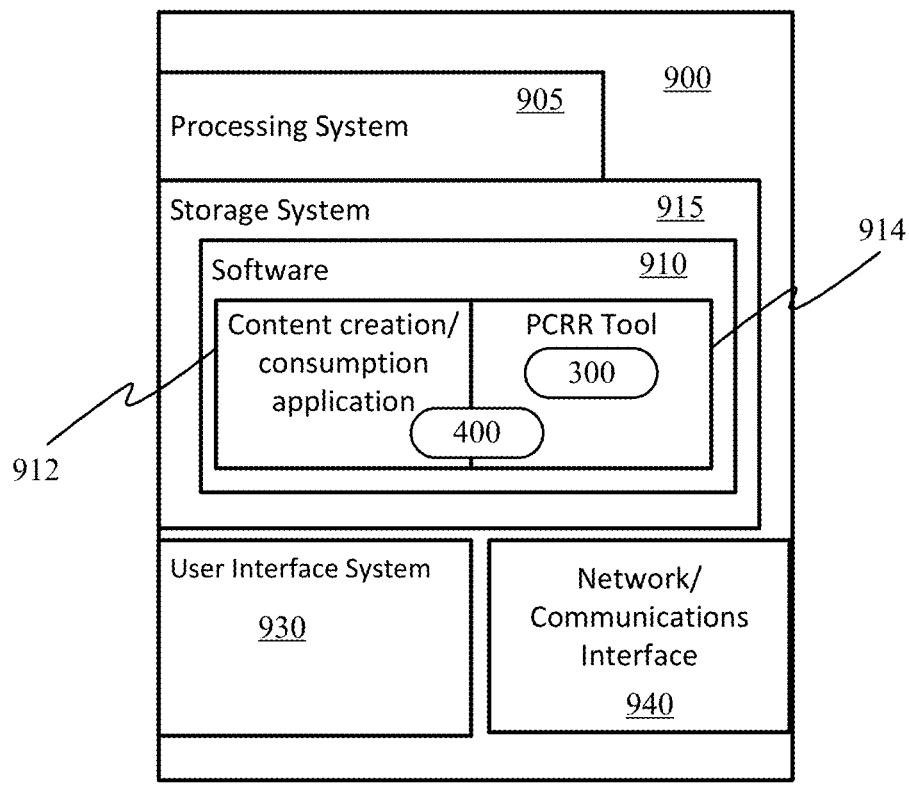
FIG. 9 shows an example computing system for analyzing and prescribing content changes to achieve target readability level.

FIG. 9 shows an example computing system for analyzing and prescribing content changes to achieve target readability level. Referring to FIG. 9, system 900 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen. Accordingly, more or fewer elements described with respect to system 900 may be incorporated to implement a particular computing device.

System 900 includes a processing system 905 of one or more hardware processors to transform or manipulate data according to the instructions of software 910 stored on a storage system 915. Examples of processors of the processing system 905 include general purpose central processing units (CPUs), graphics processing units (GPUs), field programmable gate arrays (FPGAs), application specific processors, and logic devices, as well as any other type of processing device, combinations, or variations thereof. The processing system 905 may be, or is included in, a system-on-chip (SoC) along with one or more other components such as network connectivity components, sensors, video display components.

The software 910 can include an operating system (OS) and application programs, including a content creation and/or consumption application 912 and PCRR tool 914. PCRR Tool may be a widget or add-on to application 912. PCRR tool 914 can include instructions for method 300 as described with respect to FIG. 3 and the PCRR tool 914 and/or application 912 can include instructions for method 400 as described with respect to FIG. 4.

Storage system 915 may comprise any computer readable storage media readable by the processing system 905 and capable of storing software 910 including the application 912 and PCRR tool 914. Storage system 915 can also include a readability algorithms resource (e.g., 240 of FIG. 2, 510 of FIG. 5).

Storage system 915 may include volatile and nonvolatile memories, removable and non-removable media implemented in any method or technology for storage of information, such as computer readable instructions, data structures, program modules, or other data. Examples of storage media of storage system 915 include random access memory, read only memory, magnetic disks, optical disks, CDs, DVDs, flash memory, magnetic cassettes, magnetic tape, magnetic disk storage or other magnetic storage devices, or any other suitable storage media. In no case does "storage media" consist of transitory, propagating signals.

Storage system 915 may be implemented as a single storage device but may also be implemented across multiple storage devices or sub-systems co-located or distributed relative to each other. Storage system 915 may include additional elements, such as a controller, capable of communicating with processing system 905.

The system can further include user interface system 930, which may include input/output (I/O) devices and components that enable communication between a user and the system 900. User interface system 930 can include one or more input devices such as, but not limited to, a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 930 may also include one or more output devices such as, but not limited to, display screen(s), speakers, haptic devices for tactile feedback, and other types of output devices. In certain cases, the input and output devices may be combined in a single device, such as a touchscreen display which both depicts images and receives touch gesture input from the user.

A natural user interface (NUI) may be included as part of the user interface system 930. Examples of NUI methods include those relying on speech recognition, touch and stylus recognition, gesture recognition both on screen and adjacent to the screen, air gestures, head and eye tracking, voice and speech, vision, touch, hover, gestures, and machine intelligence. Accordingly, the systems described herein may include touch sensitive displays, voice and speech recognition, intention and goal understanding, motion gesture detection using depth cameras (such as stereoscopic or time-of-flight camera systems, infrared camera systems, red-green-blue (RGB) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Visual output may be depicted on a display of the user interface system 930 in myriad ways, presenting graphical user interface elements, text, images, video, notifications, virtual buttons, virtual keyboards, or any other type of information capable of being depicted in visual form.

The user interface system 930 may also include user interface software and associated software (e.g., for graphics chips and input devices) executed by the OS in support of the various user input and output devices. The associated software assists the OS in communicating user interface hardware events to application programs using defined mechanisms. The user interface system 930 including user interface software may support a graphical user interface, a natural user interface, or any other type of user interface.

Network interface 940 may include communications connections and devices that allow for communication with other computing systems over one or more communication networks (e.g., network 640 of FIG. 6). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for analyzing and prescribing content changes to achieve target readability levels for a user document inputted by a user into a user application being executed by a processor, comprising:
   a prescriptive content readability recommendation (PCRR) tool configured to receive a specified readability index from the user in the user application and to operate in conjunction with the user application to apply a readability algorithm from a readability algorithm data store to the user document to provide a readability score for the user document based on the specified readability index; and
   a statistics and configuration data store coupled to the PCRR tool, wherein the statistics and configuration data store is configured to store statistics about readability levels in the specified readability index associated with different target document audiences,
   wherein the PCRR tool is configured to receive a purpose type input, entered by the user into the user application specifying a target audience for the user document, and to utilize statistics stored in the statistics and configuration data store regarding readability levels associated with the target audience to make recommendations to the user via the user application to improve the readability score of the user document to achieve the target readability level in the specified readability index for the target audience specified in the purpose type input,
   wherein the statistics and configuration data store includes:
      a first personal statistics data store configured to provide personal statistics about readability trends of the user to the PCRR tool to use for making the recommendations; and
      a second group statistics data store coupled to receive the personal statistics about readability trends of the user from the first personal statistics data store and configured to provide group statistics about readability trends of other documents, similar to the user document, prepared by other authors in a group of users associated with the user, to the PCRR tool to use for making the recommendations,
   wherein the user application is configured to generate a graphical user interface on a display device indicating the specified readability index and the target readability level,
   wherein the PCRR tool is configured to provide, for display in the graphical user interface, a visual indicator for each of identified one or more sentences in the user document which are determined by the PCRR tool to be outside of the target readability level and to make recommendations in the graphical user interface for rewriting these identified one or more sentences to achieve the target readability level, and
   wherein the PCRR tool is configured to turn off the display of the visual indicator on the display device for any one of the identified one or more sentences for which the user has accepted a recommendation for rewriting the sentence or has rewritten the sentence so that the sentence is no longer outside of the target readability level.

2. The system of claim 1, wherein the PCRR tool is included as a plug-in or a built-in feature of the user application.

3. The system of claim 1, wherein the PCRR tool is included in a web-application provided by a server separate from the processor executing the user application.

4. The system of claim 1, wherein the PCRR tool is a service application provided by a server separate from the processor executing the user application.

5. The system of claim 1, wherein the statistics and configuration data store includes personal statistics about readability trends of the user.

6. The system of claim 1, wherein the group statistics and configuration data store includes organizational statistics about readability trends of the other documents, similar to the user document, prepared by other authors in a same organization as the user.

7. The system of claim 1, wherein the group statistics and configuration data store includes community statistics about readability trends of the other documents, similar to the user document across an industry that the user document is being prepared for.

8. The system of claim 1, wherein the PCRR tool is configured to use machine learning to improve the PCRR tool's readability scoring and recommendations over time.

9. The system of claim 1, further comprising a store for intent recognition artificial intelligence (AI) algorithms, wherein the PCRR tool is configured to utilize the intent recognition AI algorithms to make recommendations to the user regarding which purpose type input to provide to the PCRR tool for predetermined audiences for the user document.

10. The system of claim 1, wherein the PCRR tool is configured to provide readability scores and recommendations for a plurality of input documents, provided by a bulk document processor coupled to the PCRR tool.

11. The system of claim 1, wherein utilizing statistics stored in the statistics and configuration data store regarding readability levels associated with the target audience to make recommendations to the user via the user application to improve the readability score of the user document includes the PCRR tool being configured to:
   evaluate the readability score for the user document at least at a whole document level and a sentence level based on the specified readability index;
   identify one or more sentences that contribute to the user document having the whole document level readability score outside the target readability level of the specified readability index;
   provide, for display in a graphical user interface, a visual indicator for each of the identified one or more sentences; and
   re-evaluate the readability score for the user document at the whole document level upon at least one of the identified one or more sentences being changed.

12. The system of claim 11, wherein the readability score for the user document is evaluated in response to a trigger.

13. The system of claim 12, wherein the trigger comprises a punctuation mark or a paragraph mark.

14. The system of claim 12, wherein the trigger comprises selection of a command to perform the readability evaluation.

15. The system of claim 11, wherein the PCRR tool is configured to:
   request a rewrite of a selected identified sentence from a rewrite service;
   receive one or more rewrites of the selected identified sentence from the rewrite service;
   evaluate a sentence-level readability score for each rewrite of the one or more rewrites;
   rank the one or more rewrites based on the target readability level according to their corresponding sentence-level readability scores; and
   provide, for display, at least one of the one or more rewrites based on the ranking.

16. The system of claim 15, wherein the PCRR tool is configured to:
   receive a selection of one of the one or more rewrites to replace the selected identified sentence; and
   provide the selected one of the one or more rewrites for surfacing in a canvas of an application in place of the selected identified sentence, wherein replacing the selected identified sentence with the selected one of the one or more rewrites triggers the re-evaluating of the readability score.

17. The system of claim 11, wherein the visual indicator is a highlighting.

18. The system of claim 11, wherein the visual indicator is a value displayed when a cursor is in one of the identified one or more sentences.

19. The system of claim 1, wherein:
   the group statistics and configuration data store includes organizational statistics about readability trends of the other documents, similar to the user document, prepared by other authors in a same organization as the user; and
   the statistics and configuration data store further includes:
      a third group statistics data store, coupled to receive the organizational statistics about readability trends of other documents from the group statistics and configuration data store, the third group statistics data store being configured to provide community group statistics about readability trends of additional documents, similar to the user document, across an industry that the user document is being prepared for, to the PCRR tool to use for making the recommendations.

* * * * *